United States Patent [19]

Epp et al.

[11] Patent Number: 5,176,966
[45] Date of Patent: Jan. 5, 1993

[54] FUEL CELL MEMBRANE ELECTRODE AND SEAL ASSEMBLY

[75] Inventors: Danny G. Epp, Tsawwassen; Ben I. Wiens, Coquitlam, both of Canada

[73] Assignee: Ballard Power Systems Inc., North Vancouver, Canada

[21] Appl. No.: 615,363

[22] Filed: Nov. 19, 1990

[51] Int. Cl.$^5$ ............................................. H01M 8/10
[52] U.S. Cl. ...................................... 429/26; 429/42; 429/40; 429/29; 429/35
[58] Field of Search ....................... 429/42, 40, 29, 35, 429/26

[56] References Cited

U.S. PATENT DOCUMENTS

| | | | |
|---|---|---|---|
| 3,681,145 | 8/1972 | Kohlmuller et al. | 429/36 |
| 4,175,165 | 11/1979 | Adlhart | 429/30 |
| 4,279,970 | 7/1981 | Breault et al. | 429/35 |
| 4,804,592 | 2/1989 | Vandeborgh et al. | 429/33 |

FOREIGN PATENT DOCUMENTS

| | | | |
|---|---|---|---|
| 128308A | 12/1984 | European Pat. Off. | 429/35 |
| 174762A | 3/1986 | European Pat. Off. | 429/36 |
| 0119172 | 7/1983 | Japan | 429/35 |

OTHER PUBLICATIONS

Electrode Processes and Electrochemical Engineering, Fumio Hine, Plenum Press, N.Y. (1985) p. 184.

Primary Examiner—Anthony McFarlane
Assistant Examiner—C. Everhart
Attorney, Agent, or Firm—McAndrews, Held & Malloy, Ltd.

[57] ABSTRACT

A fully supported membrane assembly for an electrochemical fuel cell is provided. A first and second layer of porous electrically conductive sheet material, such as carbon filter paper, has a solid polymer ion exchange membrane interposed therebetween. The layers of sheet material cover and support the membrane over substantially its entire surface area. The layers of sheet material are coated with a catalyst to tender them electrochemically active. The layers of sheet material and the membrane are bonded together to form a consolidated assembly. Openings are formed in the layers of sheet material and the membrane to accommodate the passage of fluids through the assembly. Seals are formed by impregnating the layers of sheet material with a sealant material which generally circumscribes the fluid passage openings and the electrochemically active portion of the assembly. Alternatively, grooves are formed in the surfaces of the electrodes facing away from the membrane, and sealant material is deposited into the grooves. The grooves generally circumscribe the fluid passage openings and the electrochemically active portion of the assembly.

50 Claims, 3 Drawing Sheets

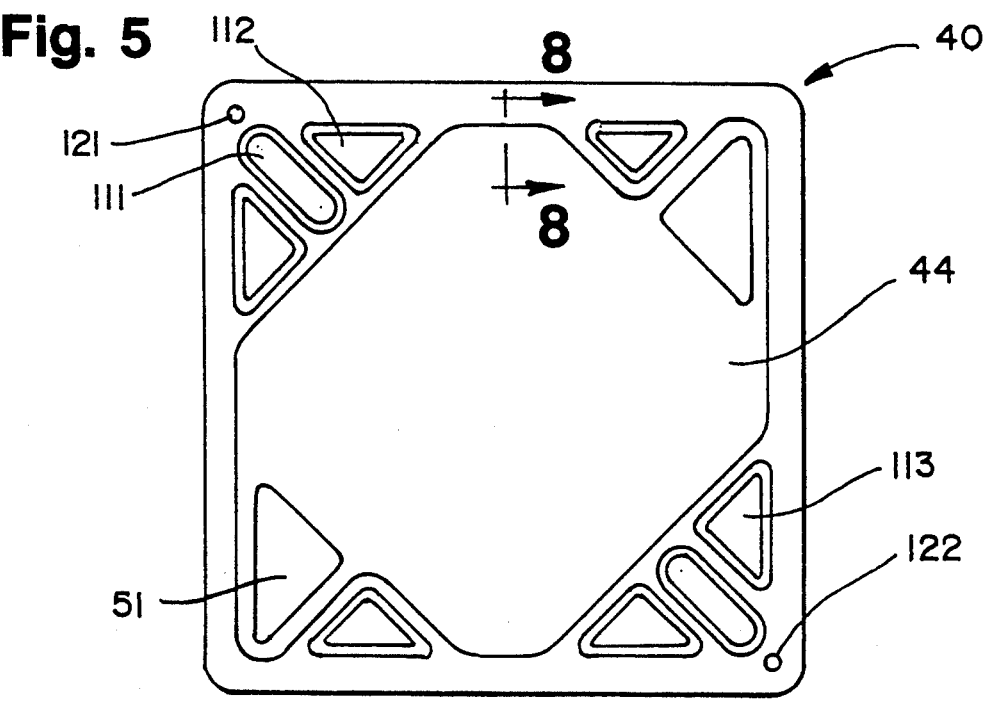
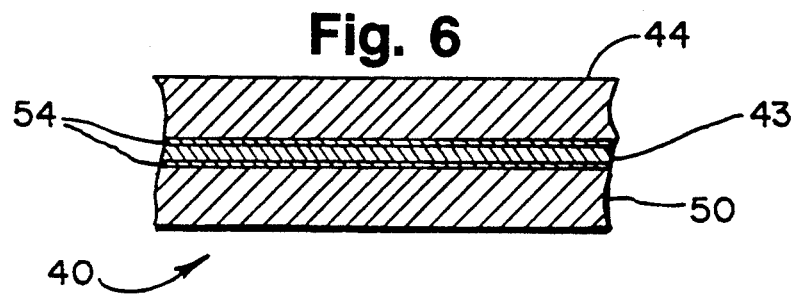
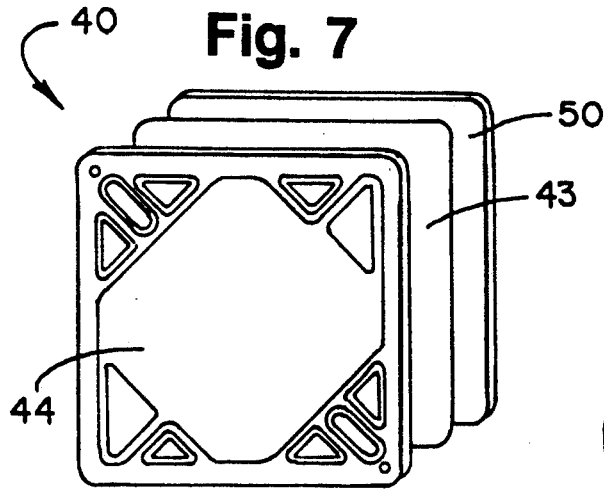
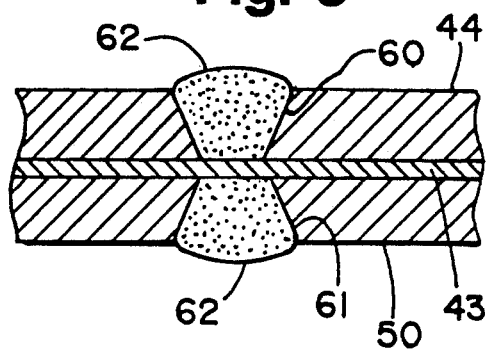

FUEL CELL MEMBRANE ELECTRODE AND SEAL ASSEMBLY

FIELD OF THE INVENTION

This invention relates to a membrane electrode and seal assembly and, more particularly, to such an assembly as used in electrochemical fuel cells employing solid polymer ion exchange membranes.

BACKGROUND OF THE INVENTION

Electrochemical fuel cells employing membrane electrode assemblies are known and have been produced and sold for many years. Such cells are known as solid polymer type fuel cells, and comprise, in the heart of the system, two porous electrodes separated by an electrolyte material. The porous electrodes, conveniently made from carbon fiber paper ("CFP") and a catalyst such as platinum, and the electrolyte material in the form of a membrane together form an assembly called a membrane electrode assembly ("MEA"). The MEA is located between two electrically conductive or, conveniently, graphite flow field plates. The graphite flow field plates supply fuel and oxidant in the form of hydrogen and air or oxygen, respectively, to the MEA and also act to provide current generated by the fuel cell to an external electrical circuit where it may be stored or otherwise used. The fuel and oxidant are supplied to the MEA by grooves in the surface of the graphite flow field plates adjacent the carbon fiber paper. The grooves communicate via manifolds carrying gases to each of the individual MEAs.

The assembly includes a catalytic material, conveniently platinum as aforesaid, on the surface of the CFP which renders the CFP an electrode. Each electrode portion of the CFP contacts the membrane. The CFP of the electrode is made hydrophobic. Ridges between the grooves in the graphite flow field plates contact the back of the electrode portion of the CFP. The MEA consumes the fuel and oxidant through an electrochemical process and produces an electrical current which can be drawn from the electrodes to an external circuit.

To ensure that the fuel and oxidant gases supplied to the MEA do not mix, sealing to prevent such mixing is imperative. In the event that hydrogen and oxygen combine within the fuel cell in combination with the catalyst, a combustible mixture can form and inflame. In the event that the fuel and oxidant leak from the interior to the exterior of the fuel cell, it can reduce the efficiency of the fuel cell and create a fire or explosive hazard.

In conventional fuel cells, an MEA was used between the two electrically conductive, preferably graphite, plates which included a membrane bonded between the CFP layers. The membrane extended substantially beyond the edge or periphery of the CFP layers and was not supported by or bonded to them, and the CFP layers covered only the inner or active portion of the membrane. The outer periphery of the membrane was free of the CFP.

This conventional membrane electrode assembly was disadvantageous in several respects. First, the membrane was installed between two adjacent electrically conductive plates and acted as a gasket sealing the gases in the electrode region from the exterior, isolating the gases in their respective manifolds and electrically insulating the electrical conducting flow field plates between which it was installed.

Such a configuration for the membrane, however, did not function well as a gasket. The membranes were subject to shrinking and swelling depending on the water content of the membrane. Since they were free to shrink and swell, the potential for tearing or for fatigue cracks to form was high. Although various techniques were utilized in an attempt to minimize the leaks across the membrane between the flow field plates, the techniques were expensive and substantially ineffective over an extended time period.

These applications of the membrane electrolyte, where the unsupported outer edges of the membrane serve as the insulator and gasket between the opposing flow field plates, place strength and resilience demands upon the membrane which then limit the minimum thickness of electrolyte which can realistically be used in a fuel cell. At a thickness below about 0.005 inches, the typical membrane material is too fragile to withstand the compressive forces required for sealing. Such thin membranes are subject to tearing when the cell is assembled or disassembled and when the membrane electrolyte is cycled between the hydrated operating state and the dehydrated non-operating state.

Up to a point, it is desirable to reduce the thickness of the membrane electrolyte as the electrolyte represents a substantial component of the internal electrical resistance of the fuel cell. A fuel cell with a thinner electrolyte will have a lower internal resistance and thus a higher voltage will be available at the fuel cell terminals for a given current demand. This translates directly into a greater power and fuel efficiency being derived from a fuel cell with a thinner electrolyte. This improvement is balanced only by the requirement that the membrane be sufficiently thick to sustain the operating pressure differential between the fuel and oxidant gases and to minimize the diffusional mixing of these two gas streams through the membrane.

With the unsupported membrane of the conventional membrane electrode assembly, it was also necessary to machine a recess in each flow field plate contiguous with the periphery of the CFP so that the MEA could be appropriately positioned between the flow field plates with a uniform distance being maintained about the periphery so that the membrane could be tightened appropriately between the plates and function with a good sealing action. Such machining was time consuming and expensive and, in fact, did not assist substantially in enhancing the sealing action.

Yet a further disadvantage with the conventional membrane electrode assembly was that the membrane itself was difficult to position and maintain in position while the stack assembly was being assembled. This was so since the membrane is quite thin and is inherently very flexible. It was also being subject to expanding and contracting due to the humidity changes in the gases to which the membrane was subjected.

Yet a further disadvantage in the prior membrane electrode assembly was the problem of positioning seals about the water and gas passages which extended through the flow field plates and the membrane. This was accomplished by machining grooves in the graphite flow field plates on either side of the membrane assembly and manually positioning rubber seals in the grooves. This was time consuming and, when assembling the cells, the seals could be dislodged from the grooves if of an O-ring configuration. If the seals took a rectangular configuration, they could be rolled in their grooves. In either case, the sealing action was adversely affected.

SUMMARY OF THE INVENTION

According to the invention, a membrane assembly for an electrochemical fuel cell comprises first and second layers of porous electrically conductive sheet material and a membrane interposed therebetween. The layers of sheet material cover and support substantially the entire surface of the membrane.

In the preferred embodiment, the membrane is a solid polymer ion exchange membrane and the sheet material comprises carbon fiber paper. The membrane most preferably has a thickness between about 0.001 inches and about 0.005 inches.

In the membrane assembly of the active section of the fuel cell, each of the layers of sheet material further includes a catalyst on at least a portion thereof. The layers of sheet material are thereby rendered electrochemically active in the area containing the catalyst. The preferred catalyst comprises platinum. The catalyst is preferably included on at least a portion of the surface of each of the layers of sheet material facing the membrane. Most preferably, the catalyst is included on the central portion of each of the layers of sheet material. The layers of sheet material and the membrane are preferably bonded together to form a consolidated membrane electrode assembly.

In the preferred membrane electrode assembly, the layers of sheet material and the membrane have openings formed therein to accommodate the passage of fluids through the assembly. The fluids include fuel gas, oxidant gas and coolant. The preferred coolants are water and ethylene glycol.

In one embodiment of the membrane electrode and seal assembly, each of the layers of sheet material has grooves formed in the surface thereof facing away from the membrane. The grooves have an extrudable sealant material deposited therein, and generally circumscribe the fluid passage openings. A groove generally circumscribing the electrochemically active portion of the assembly can also be formed in each of the layers of sheet material. The sealant material preferably extends within the pores of the sheet material and protrudes above the surfaces facing away from the membrane. The grooves preferably extend substantially the entire thickness of each of the layers of sheet material, and in the most preferred embodiment, the sealant material contacts the membrane. The sealant material preferably comprises silicon rubber.

In another embodiment of the membrane electrode and seal assembly, the surfaces of the layers of sheet material facing away from the membrane are impregnated with a sealant material. The sealant material generally circumscribes the fluid passage openings. The sealant material can also circumscribe the electrochemically active portion of the assembly. The sealant material preferably protrudes above the surfaces facing away from the membrane, and extends substantially the entire thickness of the layers of sheet material. In the most preferred embodiment, the sealant material contacts the membrane. The sealant material preferably comprises silicon rubber.

A first method of forming a membrane assembly comprises the steps of:

bonding a solid polymer ion exchange membrane between two layers of porous electrically conductive sheet material, the layers covering and supporting substantially the entire surface of the membrane, the layers and the membrane having openings formed therein to accommodate the passage of fluids through the assembly, forming grooves in the surfaces of the layers facing away from the membrane, the grooves generally circumscribing the fluid passage openings, and depositing an extrudable sealant material into the grooves.

The preferred first method further comprises applying a mixture comprising a catalyst and polytetrafluoroethylene to the surface of each of the layers of sheet material facing the membrane. The catalyst is preferably applied to at least a portion of the surface of each of the layers of sheet material facing the membrane. The preferred catalyst comprises platinum.

A second method of forming a membrane assembly comprises the steps of:

bonding a solid polymer ion exchange membrane between two layers of porous electrically conductive sheet material, the layers of sheet material covering and supporting substantially the entire surface of the membrane, the layers of sheet material and the membrane having openings formed therein to accommodate the passage of fluids through the assembly, impregnating the surfaces of the layers of sheet material facing away from the membrane with a sealant material, the sealant material generally circumscribing the fluid passage openings.

A membrane assembly for the humidification section of an electrochemical fuel cell comprises first and second layers of a porous sheet material and a water permeable membrane interposed therebetween. The layers of sheet material cover and support substantially the entire surface of the membrane.

In the preferred humidification membrane assembly, the membrane is a solid polymer ion exchange membrane and the sheet material comprises carbon fiber paper. The layers of sheet material and the membrane having openings formed therein for accommodating the passage of fluids through the assembly. The fluids include fuel gas and oxidant gas.

In a first embodiment of the humidification membrane assembly, each of the layers of sheet material has grooves formed in the surface thereof facing away from the membrane. The grooves have an extrudable sealant material deposited therein, and generally circumscribe the fluid passage openings. In the preferred first embodiment, the sealant material protrudes above surfaces facing away from the membrane, the grooves extend substantially the entire thickness of the layers of sheet material, and the sealant material contacts the membrane. The preferred sealant material comprises silicon rubber.

In a second embodiment of the humidification membrane assembly, the surfaces of the layers of sheet material facing away from the membrane are impregnated with a sealant material, and the sealant material generally circumscribes the fluid passage openings. In the preferred second embodiment, the sealant material protrudes above surfaces facing away from the membrane, the grooves extend substantially the entire thickness of the layers of sheet material, and the sealant material contacts the membrane. The preferred sealant material comprises silicon rubber.

A first method of forming a humidification membrane assembly comprises the steps of:

bonding a water permeable membrane between two layers of porous sheet material, the layers of sheet material covering and supporting substantially the entire surface of the membrane, the layers of sheet material and the membrane having openings formed therein to accommodate the passage of fluids through the assembly, forming grooves in the surfaces of the layers of sheet material facing away from the membrane, the grooves generally circumscribing the fluid passage openings, and depositing an extrudable sealant material into the grooves.

A second method of forming a humidification membrane assembly comprises the steps of:

bonding a water permeable membrane between two layers of porous sheet material, the layers of sheet material covering and supporting substantially the entire surface of the membrane, the layers of sheet material and the membrane having openings formed therein to accommodate the passage of fluids through the assembly, impregnating the surfaces of the layers of sheet material facing away from the membrane with a sealant material, the sealant material generally circumscribing the fluid passage openings.

BRIEF DESCRIPTION OF THE DRAWINGS

A specific embodiment of the invention will now be described, by way of example only, with the use of drawings in which:

FIG. 5 is a front view of a membrane electrode assembly according to the invention;

FIG. 6 is a bottom view of the membrane electrode assembly of FIG. 5:

FIG. 7 is an exploded perspective view of the membrane electrode assembly of FIGS. 5 and 6; and FIG. 8 is an enlarged cross-sectional view of a typical sealing groove in the electrode taken along line 8—8 of FIG. 5.

DETAILED DESCRIPTION OF THE DRAWINGS

Figure 1:
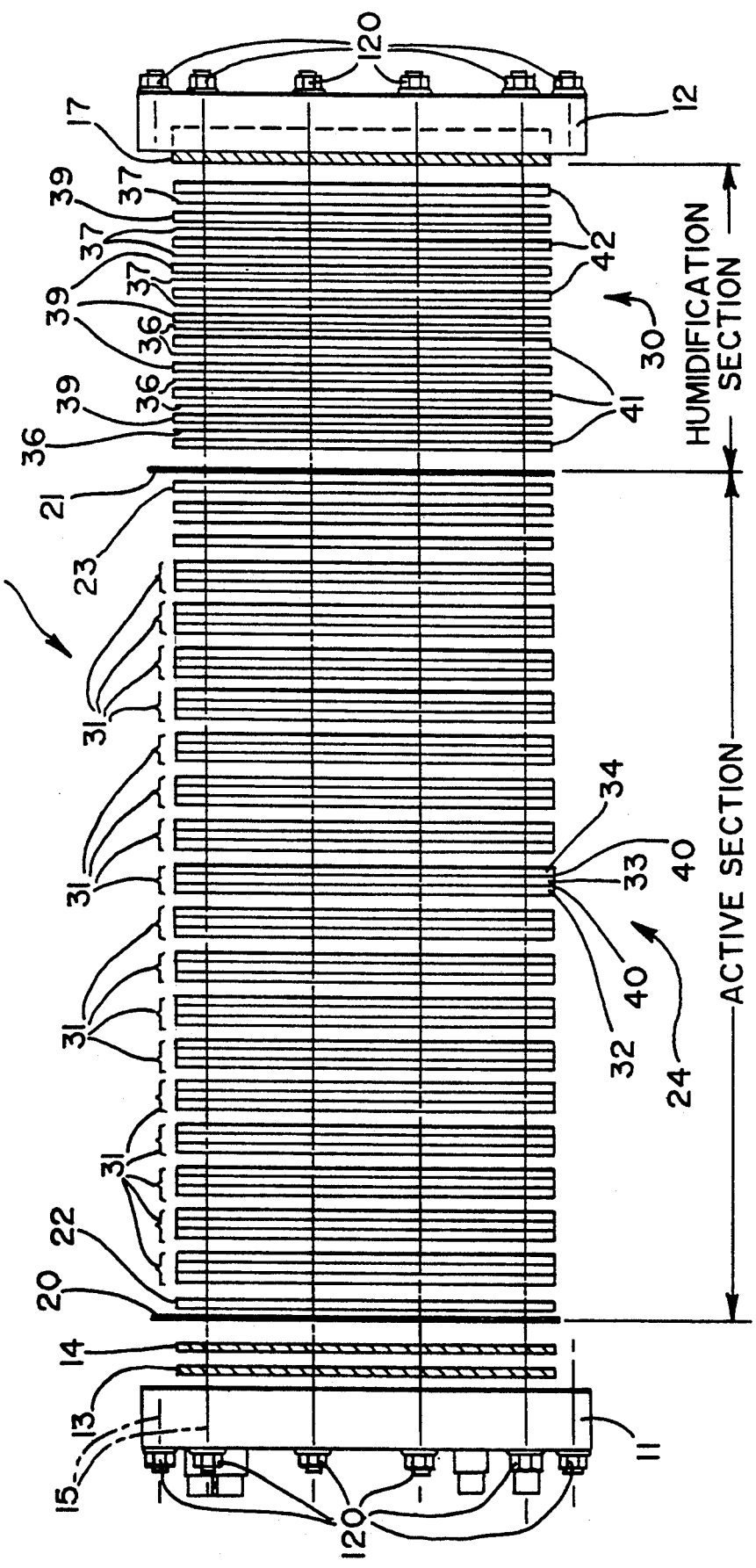
FIG. 1 is an exploded side view of the stack assembly for a fuel cell incorporating the membrane electrode and seal assembly according to the invention.

Referring now to the drawings and, in particular, to FIG. 1, a fuel cell stack assembly is generally illustrated in exploded form at 10. The stack assembly includes a pair of end plates 11, 12 which conveniently are fluid end plates which terminate the stack assembly 10 and a plurality of threaded tie rods 15 extending between the end plates 11, 12 to retain and hold the stack assembly 10 in its assembled condition.

A spacer plate 13 and an electrical isolation plate 14 are positioned inside the end plate 11 and a piston 17 is positioned within the end plate 12. Buss plates 20, 21 are located on opposite ends of the stack assembly 10 as indicated and carry the voltage and current generated by the fuel cell 10. Cooling water jackets 22, 23 are located immediately inside the buss plates 20, 21.

The stack assembly 10 includes a so-called "active" section generally illustrated at 24 and a "humidification" section generally illustrated at 30. The active section 24 includes in addition to the buss plates 20, 21 and cooling water jackets 22, 23, a plurality of identical assemblies illustrated generally at 31, each assembly consisting of three fluid flow field or graphite plates 32, 33, 34 and two membrane electrode assemblies generally illustrated at 40 which are assembled between the plates 32, 33, 34. In each assembly 31, the leftmost flow plate 32 carries the fuel in the form of hydrogen gas, the center flow plate 33 carries the oxidant in the form of oxygen or air on one side and hydrogen on the opposite side and the rightmost plate 34 carries the oxidant on the side adjacent the assembly 40 and water on the opposite side. The configuration of the assembly 31 thus provides for the hydrogen and the oxidant to be located on opposite sides of each membrane electrode assembly 40 and a coolant fluid flow plate in the form of a coolant jacket which is, in the present instance, a water jacket, to be located adjacent each hydrogen flow field plate. This configuration is typical and extends throughout the active section 24.

The humidification section 30 includes a plurality of oxidant flow field plates 41 generally located on the left hand side of the humidification section 30 illustrated in FIG. 1. The humidification section 30 also includes a plurality of fuel humidification flow field plates 42 generally located on the right hand side of the humidification section 30, a plurality of fuel humidification membranes 37 and a plurality of oxidant humidification membranes 36 positioned between the fuel humidification flow field plates 42 and the oxidant flow field plates 41, respectively. The humidification section 30 acts to humidify the gases used so that the solid polymer ion exchange membranes in the active section 24 will remain moist or wet as described hereafter. In general, hydrogen ions will diffuse less readily through solid polymer ion exchange membranes if the membranes are allowed to dry. A lower rate of hydrogen diffusion will in turn reduce overall cell efficiency. The humidification section 30 is intended to prevent the membranes from drying by humidifying the fuel and oxidant gases fed to the active section 24.

The active section 24 also differs from the humidification section 30 in that there is no electricity produced in the humidification section 30 whereas in the active section 24 electricity is produced by reason that a catalyst in the form of platinum is present in the carbon fiber paper forming the membrane electrode assemblies 40 and thus renders a portion of each layer of carbon fiber paper electrochemically active.

Figure 2:
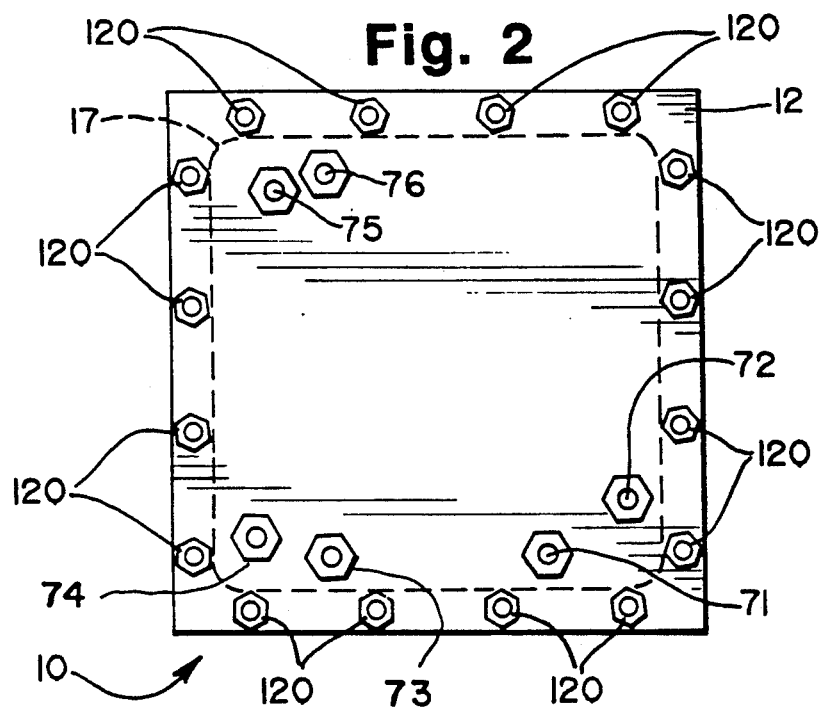
FIG. 2 is an end view of the fuel cell stack assembly illustrated in FIG. 1.

FIG. 2 is an end view of the fuel cell stack assembly 10 illustrated in FIG. 1, showing hydrogen (fuel) gas inlet 71, hydrogen (fuel) gas outlet 72, air (oxidant) inlet 73, air (oxidant) outlet 74, water inlet 75 and water outlet 76. FIG. 2 also shows end plate 12, piston 17, and tie rod nuts 120.

The membrane electrode assemblies 40 in the active section 24 are identical and a typical assembly is illustrated at 40 in FIGS. 5, 6 and 7. Each membrane electrode assembly 40 comprises three elements, namely, a first layer of a porous electrically conductive support material, conveniently a porous carbon fiber paper 44, a second layer of an electrolyte material which is a solid polymer ion exchange membrane 43, and a third layer of a porous electrically conductive support material 50, conveniently formed of carbon fiber paper. The layers of carbon fiber paper 44, 50 support the membrane 43 therebetween to form a consolidated assembly 40 as described in greater detail hereafter. The carbon fiber papers layers 44, 50 are each treated with a catalyst on the surfaces adjacent and in contact with the membrane 43, thus to form electrodes. The treated area coincides with the flow field of the graphite plates which carry the gases to the carbon fiber paper.

A solid polymer ion exchange membrane 43 is conveniently used which has a conventional thickness of approximately 0.007 inches. This thickness, however, was necessary to reduce tearing and other damage when in an unsupported configuration. It is believed that a reduced thickness will be possible to use with the membrane as supported according to the present invention and, indeed, performance comparisons made to date indicate that with a constant cell terminal voltage, a membrane having a reduced thickness will give enhanced current density. For example, with a membrane cell voltage of 0.6 volts, a DOW 4 membrane with a thickness of 0.0063–0.0066 exhibits a current density of approximately 2400 amperes per square foot whereas with the same voltage, a DOW 2 membrane having a thickness of 0.0035–0.0039 will provide a current density of approximately 3200 amperes per square foot, the only difference between the two membranes being one of thickness.

Figure 3:
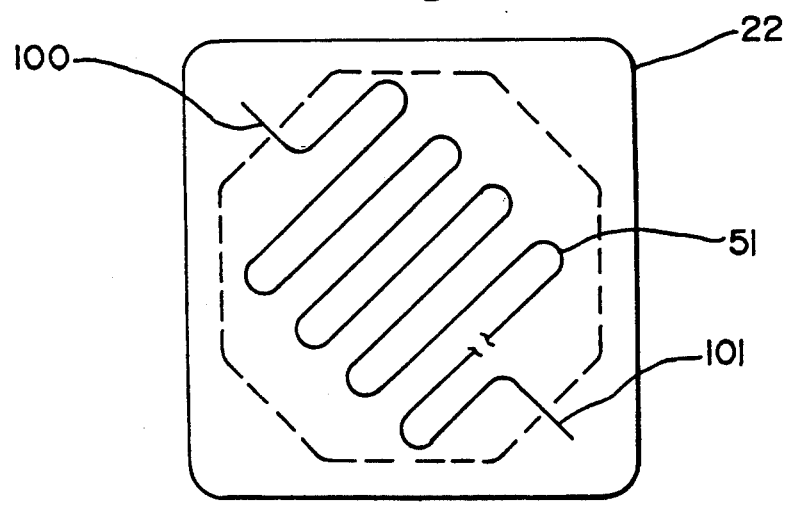
FIG. 3 is a front diagrammatic view of a conventional fluid flow field plate.
Figure 4:
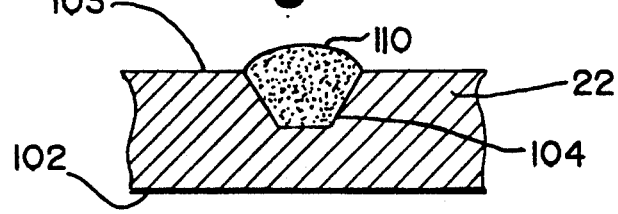
FIG. 4 is an enlarged cross-sectional view of the fluid flow groove in the conventional fluid flow field plate of FIG. 3.

A coolant fluid flow field plate 22 is illustrated in FIGS. 3 and 4. One side 102 of the plate 22 is blank but the opposite side 103 as illustrated has a plurality, namely ten, liquid carrying grooves 51 formed therein to carry the coolant, namely liquid water, from the inlet 100 to the outlet 101 although only one groove 51 is illustrated in FIG. 3 for simplicity. In addition, a plurality of openings (not shown) extend through the plate 22 to allow for passage of the hydrogen and the air or oxidant through the plate 22.

The plate 22, as described, is mounted against the blank side of the hydrogen flow field plate 32 (see FIG. 1). To that end, it is necessary to seal the plate 22 against the blank side of fuel plate 32 to prevent the escape of water. Reference is made to sealing groove 104 in FIG. 5 which carries sealant material in the form of silicon rubber or extrudable elastomeric sealant material 110. Groove 104 is machined in plate 22 and the sealant material 110 is injected into the groove 104 prior to assembling the stack assembly 10 and, in particular, prior to assembling the plate 22 against the fuel flow field plate 32.

Referring to the membrane electrode assembly 40 of FIGS. 5, 6 and 7, the two layers of carbon fiber paper 44, 0 support the membrane 43 completely therebetween so as to form a consolidated unit. It will be particularly noted that the membrane 43 is interposed between the layers 44, 50 over substantially all of its surface area and that the opening 51 (air outlet), opening 52 (air inlet), opening 111 (water outlet), opening 112 (water inlet), opening 113 (hydrogen outlet), and opening 114 (hydrogen inlet) extend through not only the membrane 43 but also through the carbon fiber layers 44 and 50.

A fuel gas which is conveniently hydrogen is supplied to the back of one of the porous electrodes while an oxidant gas such as oxygen or air is supplied to the back of the other electrode. The electrochemical process thereby carried out consumes the fuel and oxidant and produces an electric current which is available to be drawn from the porous electrodes. The membrane 43 permits the diffusion through the membrane 43 of hydrogen ions and is intended to be substantially impervious to hydrogen and oxygen molecules. A catalyst 54, in the present case being platinum, is added to the surface area of each of the carbon fiber paper surfaces adjacent the membrane 43. The catalyst promotes the electrochemical reaction of hydrogen and oxygen, renders the carbon fiber paper electrochemically active and thereby produces the electrical current generated at the buss plates 20, 21.

With reference now to FIG. 8, sealing grooves 60, 61 are formed in the layers 44, 50, respectively, but the grooves do not extend through the membrane 43. The grooves can extend to each side of the membrane as illustrated in FIG. 8. The grooves 60, 61 are injected with sealant material 62 prior to assembling the fuel cell 10. An appropriate sealant material 62 is a silicon rubber material and a particularly suitable material is known as SILASTIC E RTV material.

The membrane electrode assembly 40 is assembled by initially submerging the carbon fiber paper 44, 50 into a mixture of deionized water and TEFLON brand polytetrafluoroethylene. The carbon fiber paper 44, 50 is allowed to absorb the TEFLON for 10–15 minutes. The carbon fiber paper 50 is then removed from the mixture, air dried for 10–15 minutes, and placed on a hot plate at a temperature of approximately 410 degrees C. to soften and bond the TEFLON mixture to the carbon fiber paper 44, 50 in a sintering process. When the sintering process is complete, the carbon fiber paper 44, 50 is coated with a mixture of a platinum catalyst and TEFLON in the areas earlier described opposite the flow field plate which carry the gases to the electrode area. This mixture is also bonded within the carbon fiber paper 44, 50 in a further sintering process.

Two layers 44, 50 of carbon fiber paper are used with each membrane 43 for each membrane electrode assembly 40. The bonding of the layers 44, 50 with the membrane 43 is done under a combined process of heat, pressure and time until the bonding process is complete and the membrane electrode assembly 40 is consolidated into a single unitary assembly. The consolidation process involves placing the assembly 40 in a press at a temperature of 175 degrees C. and increasing the pressure to 1000 p.s.i. A coolant drops the temperature to L; approximately 80 degrees C. over 10 minutes and the bonding process is complete.

The assembly 40 is then milled so as to provide the sealing grooves 60, 61. Subsequently, the coolant, oxidant and fuel inlet and outlet openings, represented by openings 51, 52, 111, 112, 113 and 114 in FIG. 5, and the guide pin holes 121, 122 which are used for assembly purposes are punched through the layers 44, 50 and the membrane 43. The sealant material 62 is injected into the sealing grooves 60, 61 on both sides of the electrode assembly 40.

The fuel cell 10 is then assembled by using the guide pin holes 121, 122 as guides for guide pins (not shown). The various components are stacked together and, when assembled, the nuts 120 (see FIG. 1) on the ends of the tie rods of fuel cell 10 are torqued to apply suitable compressive force.

In operation, the fuel, preferably in the form of hydrogen, flows from the hydrogen supply and enters the humidification section 30 through the fuel humidification flow field plates 42 (see FIG. 1) where the fuel gas is humidified by the water carried by the humidified water jacket plates 39 to a value preferably close to 100% relative humidity. The humidified fuel gas then passes to the active section 24 of the stack assembly 10 where the humidified fuel gas passes through the hydrogen or fuel flow field plates 32 adjacent the anodes side of the membrane electrode assemblies 40. The oxidant gas supplied to the second electrode and the fuel are consumed by the electrochemical process and an electrical current is generated which is available to be drawn from the porous electrodes. The unused hydrogen exits the plate 32 in the active section 24 and passes to a tank (not shown) where excess hydrogen may be returned to the inlet line 63 and wherein the above process is repeated.

The oxidant in the form of air or oxygen enters the humidification section 30 of the stack assembly 10 where it is humidified as it passes through the oxidant humidification flow field plates 41 (see FIG. 1) adjacent the humidification water jacket plates 39. The humidified oxidant gas then passes to the active section 24 and through the oxidant or fuel flow field plates 33, 34 adjacent the cathode side of the membrane electrode assemblies 40. The air or oxygen then flows out of the active section 24 to a separate tank (not shown) where any water formed is collected for return to the fuel cell 10 for cooling.

In operation, liquid water is provided to the active section 24 of the fuel cell 10 and circulated therethrough to neutralize the heat generated by the exothermic reaction in the fuel cell. The water travels through the water jacket flow field plates 22, 34 adjacent the hydrogen and oxygen flow field plates 32, 33 (see FIG. 1). The water then travels to the humidification section 30 and then to a tank where it can be pumped back to the fuel cell 10.

Many modifications will readily occur to those skilled in the art. For example, rather than a graphite material being used for the electrical conducting plates, other substances could be used including a composite material of KYNAR and graphite powder. Likewise, an elastomeric material could be used for the sealant material rather than rubber. It will also be understood that the electrode material may not necessarily be hydrophobic although in the present case, it is so desirable. Although platinum is used as a catalyst in the present instance, it would be possible to use other catalytic substances to promote the reaction. Likewise, while water has been described as being used as coolant, any other suitable coolant, such as ethylene glycol, may be used.

It is further contemplated that rather than machining or milling grooves into the carbon fiber paper which will eventually be used as electrodes and injecting the sealant material into the grooves, grooves need not be formed at all. In this regard, the sealant material could be injected directly into the porous carbon fiber paper to a depth that would contact the membrane without forming grooves and that the quantity of the sealant injected would be such that it would continue to protrude slightly above the surface of the electrode and thereby continue to perform its sealing action in the same manner as set out earlier.

In addition to employing the fully supported membrane electrode and seal assembly in the electrochemically active portion of a fuel cell stack, a fully supported membrane and seal assembly can also be employed in the humidification portion of a fuel cell stack. For ease of manufacture, the membrane assembly in the humidification portion is usually formed of the same membrane and conductive sheet material (preferably carbon fiber paper) as those used in the electrochemically active portion. In the humidification portion, however, the carbon fiber paper is generally not coated with catalyst. As with the membrane assembly used in the electrochemically active portion, it has been found advantageous to employ layers of porous sheet material in the humidification portion which cover and support substantially the entire surface of the membrane. Similarly, the grooving and sealing techniques employed on the porous electrically conductive sheet material in the electrochemically active portion can also be advantageously employed on the porous sheet material in the humidification portion of a fuel cell stack.

Many further modifications will readily occur to those skilled in the art to which the invention relates and the specific embodiments described herein should be taken as illustrative of the invention only and not as limiting its scope in accordance with the accompanying claims.

What is claimed is:

1. A membrane electrode assembly for an electrochemical fuel cell comprising first and second layers of porous electrically conductive sheet material and a membrane interposed therebetween, said layers of sheet material covering and supporting substantially the entire surface of said membrane.

2. The membrane electrode assembly of claim 1 wherein said membrane is a solid polymer ion exchange membrane.

3. The membrane electrode assembly of claim 2 wherein said sheet material comprises carbon fiber paper.

4. The membrane electrode assembly of claim 3 wherein said membrane has a thickness between about 0.001 inches and about 0.005 inches.

5. The membrane assembly of claim 1 wherein each of said layers of sheet material further includes a catalyst on at least a portion thereof, said layers of sheet material rendered electrochemically active in the area containing said catalyst.

6. The membrane electrode assembly of claim 5 wherein said catalyst comprises platinum.

7. The membrane electrode assembly of claim 5 wherein said catalyst is included on at least a portion of the surface of each of said layers of sheet material facing said membrane.

8. The membrane electrode assembly of claim 7 wherein said catalyst is included on the central portion of each of said layers of sheet material, said central portion substantially coinciding with the flow field carrying reactant gas to said sheet material layer.

9. The membrane electrode assembly of claim 5 wherein said layers of sheet material and said membrane are bonded together to form a consolidated membrane electrode assembly.

10. The membrane electrode assembly of claim 5, said layers of sheet material and said membrane having openings formed therein to accommodate the passage of fluids through said assembly.

11. The membrane electrode assembly of claim 10 wherein said fluids include fuel gas, oxidant gas and coolant.

12. The membrane electrode assembly of claim 11 wherein said coolant is water.

13. The membrane electrode assembly of claim 11 wherein said coolant is ethylene glycol.

14. The membrane electrode assembly of claim 10 wherein each of said layers of sheet material has grooves formed in the surface thereof facing away from said membrane, said grooves having an extrudable sealant material deposited therein, said grooves generally circumscribing said fluid passage openings.

15. The membrane electrode assembly of claim 14 wherein said sealant material extends within the pores of said sheet material.

16. The membrane electrode assembly of claim 14 wherein said sealant material protrudes above said surfaces facing away from said membrane.

17. The membrane electrode assembly of claim 14 wherein said grooves extend substantially the entire thickness of each of said layers of sheet material.

18. The membrane electrode assembly of claim 17 wherein said sealant material contacts said membrane.

19. The membrane electrode assembly of claim 14 wherein said sealant material comprises silicon rubber.

20. The membrane electrode assembly of claim 10 wherein each of said layers of sheet material has grooves formed in the surface thereof facing away from said membrane, said grooves having an extrudable sealant material deposited therein, said grooves generally circumscribing the electrochemically active portion of said assembly.

21. The membrane electrode assembly of claim 20 wherein said sealant material extends within the pores of said sheet material.

22. The membrane electrode assembly of claim 20 wherein said sealant material protrudes above said surfaces facing away from said membrane.

23. The membrane electrode assembly of claim 20 wherein said grooves extend substantially the entire thickness of each of said layers of sheet material.

24. The membrane electrode assembly of claim 23 wherein said sealant material contacts said membrane.

25. The membrane electrode assembly of claim 20 wherein said sealant material comprises silicon rubber.

26. The membrane electrode assembly of claim 10 wherein the surfaces of said layers of sheet material facing away from said membrane are impregnated with a sealant material, said sealant material generally circumscribing said fluid passage openings.

27. The membrane electrode assembly of claim 26 wherein said sealant material protrudes above said surfaces facing away from said membrane.

28. The membrane electrode assembly of claim 26 wherein said sealant material extends substantially the entire thickness of said layers of sheet material.

29. The membrane electrode assembly of claim 28 wherein said sealant material contacts said membrane.

30. The membrane electrode assembly of claim 26 wherein said sealant material comprises silicon rubber.

31. The membrane electrode assembly of claim 10 wherein the surfaces of said layers of sheet material facing away from said membrane are impregnated with a sealant material, said sealant material generally circumscribing the electrochemically active portion of said assembly.

32. The membrane electrode assembly of claim 31 wherein said sealant material protrudes above said surfaces facing away from said membrane.

33. The membrane electrode assembly of claim 31 wherein said sealant material extends substantially the entire thickness of said layers of sheet material.

34. The membrane electrode assembly of claim 33 wherein said sealant material contacts said membrane.

35. The membrane electrode assembly of claim 31 wherein said sealant material comprises silicon rubber.

36. A membrane assembly for the humidification section of an electrochemical fuel cell comprising first and second layers of a porous sheet material and a water permeable membrane interposed therebetween, said layers of sheet material covering and supporting substantially the entire surface of said membrane.

37. The membrane assembly of claim 36 wherein said membrane is a solid polymer ion exchange membrane.

38. The membrane assembly of claim 37 wherein said sheet material comprises carbon fiber paper.

39. The membrane assembly of claim 36, said layers of sheet material and said membrane having openings formed therein for accommodating the passage of fluids through the assembly.

40. The membrane assembly of claim 39 wherein said fluids include fuel gas and oxidant gas.

41. The membrane assembly of claim 39 wherein each of said layers of sheet material has grooves formed in the surface thereof facing away from said membrane, said grooves having an extrudable sealant material deposited therein, said grooves generally circumscribing said fluid passage openings.

42. The membrane assembly of claim 41 wherein said sealant material protrudes above said surfaces facing away from said membrane.

43. The membrane assembly of claim 41 wherein said grooves extend substantially the entire thickness of said layers of sheet material.

44. The membrane assembly of claim 43 wherein said sealant material contacts said membrane.

45. The membrane assembly of claim 41 wherein said sealant material comprises silicon rubber.

46. The membrane assembly of claim 39 wherein the surfaces of said layers of sheet material facing away from said membrane are impregnated with a sealant material, said sealant material generally circumscribing said fluid passage openings.

47. The membrane assembly of claim 46 wherein said sealant material protrudes above said surfaces facing away from said membrane.

48. The membrane assembly of claim 46 wherein said sealant material extends substantially the entire thickness of said layers of sheet material.

49. The membrane electrode assembly of claim 48 wherein said sealant material contacts said membrane.

50. The membrane assembly of claim 46 wherein said sealant material comprises silicon rubber.

* * * * *

UNITED STATES PATENT AND TRADEMARK OFFICE
CERTIFICATE OF CORRECTION

PATENT NO. : 5,176,966
DATED : January 5, 1993
INVENTOR(S) : Danny G. Epp and Ben I. Wiens It is certified that error appears in the above-indentified patent and that said Letters Patent is hereby corrected as shown below:

Column 7, line 52, after "44", cancel "0" and insert --50--.

Column 8, line 45, after "temperature to" cancel "L".

Column 9, line 23, after "where any", insert --pressure exceeding a predetermined value is vented and where any--.

Signed and Sealed this

Fourteenth Day of December, 1993

Attest:

BRUCE LEHMAN

Attesting Officer Commissioner of Patents and Trademarks